Figure 1:
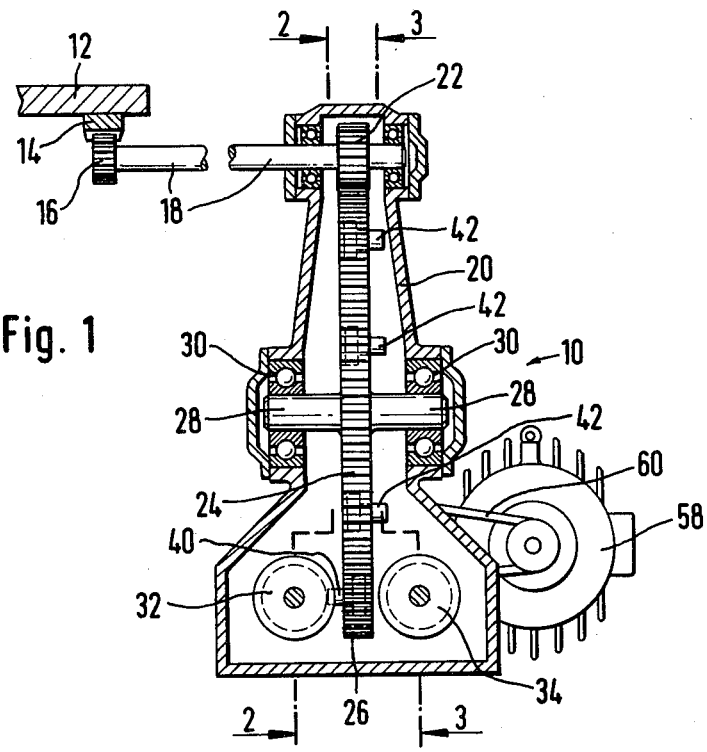

United States Patent [19]

Möller

[11] 4,448,093
[45] May 15, 1984

[54] STEPPING DRIVE MECHANISM

[75] Inventor: Reinfried Möller, Weinheim, Fed. Rep. of Germany

[73] Assignee: Expert Maschinenbau GmbH, Lorsch, Fed. Rep. of Germany

[21] Appl. No.: 300,885

[22] Filed: Sep. 10, 1981

[30] Foreign Application Priority Data

Sep. 13, 1980 [DE] Fed. Rep. of Germany ....... 3034627

[51] Int. Cl.³ .................... F16H 27/04; F16H 1/16; F16H 1/20; B23B 29/24
[52] U.S. Cl. .................................... 74/821; 74/426; 74/84 R; 74/393; 74/813 R; 74/813 C; 74/820
[58] Field of Search .................. 74/426, 820, 821, 825, 74/827, 813 R, 813 C, 393, 84 R

[56] References Cited

U.S. PATENT DOCUMENTS

| | | | |
|---|---|---|---|
| 2,852,960 | 9/1958 | Brems | 74/825 |
| 3,012,454 | 12/1961 | Brodbeck | 74/821 |
| 3,048,059 | 8/1962 | Cross | 74/813 |
| 3,059,360 | 10/1962 | Krauskopf | 74/84 R |
| 3,815,289 | 6/1974 | Hoffman | 74/422 |

*Primary Examiner*—Lawrence J. Staab
*Assistant Examiner*—Michael Bednarek

[57] ABSTRACT

Stepping drive mechanism for converting a constant input rotatory movement to a linear movement of a given length accelerated first from zero, then continuing at constant velocity, and finally decelerated back to zero, in which the constant input rotatory movement introduced into the drive of the mechanism is transmitted to cylindrical driving cams having indexing grooves provided in their cylindrical circumferential surface, which are engaged by an indexing pin provided on a carrier component coupled with the drive of the mechanism. The indexing pin carrier component has the form of a circular disk mounted for rotation about its central axis, on each of whose opposite flat sides a driving cam is provided, one associated with the acceleration-deceleration phase and one with the constant-velocity linear movement phase. The cams each have an axis of rotation disposed at right angles to the central axis of the indexing pin carrier component, in whose indexing grooves an associated indexing pin engages.

5 Claims, 7 Drawing Figures

U.S. Patent   May 15, 1984   Sheet 1 of 3   4,448,093

STEPPING DRIVE MECHANISM

BACKGROUND

The invention relates to a stepping drive mechanism for converting a constant rotary input motion to a linear movement of given length which first accelerates from zero, then takes place at constant velocity, and finally is decelerated again to zero, in which the constant rotary input motion introduced into the drive of the apparatus is mechanically transmitted to cylindrical driving cams having indexing grooves provided on their cylindrical circumferential surface, these grooves being engaged by indexing pins provided on a carrier mechanically coupled to the prime mover of the apparatus.

Stepping drives of this kind are used, for example, for driving elongated tables in production lines, for example in transfer lines or packaging machines, where workpieces are moved linearly from one work station to the next in a rapid and vibration-free manner, but also have to be repositioned accurately. For longer linear strokes, stepping drives of the kind mentioned in the beginning have proven useful, in which one indexing pin is provided on a driven carriage for positioning (at the end position) and acceleration, and another is provided for positioning and deceleration, and a plurality of transport indexing pins disposed at equal intervals between the above-mentioned two indexing pins are provided successively in series.

Three cylindrical driving cams disposed coaxially side by side, provided with indexing grooves and driven by electric motors, cooperate with these indexing pins, the indexing grooves cooperating one with the indexing pin for acceleration and positioning, one with the pin for transport at constant velocity, and one with the pin for the deceleration and positioning, in each of the particular phases of linear movement involved. These stepping drives have proven practical and are widely used. On account of their relatively large bulk, depending on the length of the linear movement, difficulties nevertheless occur in using these stepping drives, e.g., for longitudinal table drives between closely adjacent work stations if simultaneously a relatively long linear movement of the order of 3 to 6 m is required, because then the drive mechanism will not fit between the work stations. Further separating the work stations on transfer lines, if it is possible at all, nevertheless requires an enlargement of the overall installation with higher investment costs of ground and factory buildings.

THE INVENTION

It is therefore the object of the invention to create a stepping drive mechanism for longitudinal drives, which is considerably reduced in its dimensions and combines simplicity of construction and reliability of operation with the same accuracy of positioning and low vibration as the known longitudinal drives.

Setting out from a stepping drive apparatus of the kind mentioned in the beginning, this problem is solved in accordance with the invention by the fact that the indexing pin carrier is in the form of a circular disk mounted for rotation about its central axis, on whose opposite flat sides a cylindrical driving cam associated with the acceleration-deceleration phase on the one hand and another cylindrical driving cam associated with the phase of the constant-velocity linear movement on the other hand are provided, these cams having axes of rotation at right angles to the central axis of the indexing pin carrier, and their indexing grooves being engaged in each particular phase of movement by an associated indexing pin projecting from the carrier.

The carrier with the horizontally disposed central axis is then best constructed with teeth on its circumference so as to form a vertically disposed gear of large diameter, with which a pinion meshes which is coupled to a rack-and-pinion drive for converting the rotatory movement of the pinion to the desired linear movement.

In the simplest case, the pinion that is engaged with the vertically disposed gear of large diameter is coupled to an additional pinion which meshes with the rack of the rack-and-pinion drive on the component performing the rectilinear movements.

To prevent the occurrence of vibrations, it is recommended that the ratio i between the vertical gear of large diameter and the rack be designed so as to amount to 2 or less than 2, and therefore the required pitch circle circumference of the gear of large diameter, for a linear movement length of 3 to 6 meters, can be calculated to be at least 1.5 to 3 meters, and thus its diameter should be approximately 0.5 to 1 meter.

The indexing pins associated with the acceleration-deceleration phases and with the phase of constant-velocity linear movement are best disposed on the same pitch circle diameter as the circular indexing pin carrier, so that the lever arm of the indexing pins on the axis of rotation of the carrier will be of the same magnitude both in the acceleration-deceleration phases and in the phase of constant linear movement velocity. This is easily accomplished by disposing the drive cylinders on different sides of the carrier.

In an advantageous embodiment of the invention, the acceleration-deceleration driving cam has a single indexing groove, and on the flat side of the circular carrier facing the acceleration-deceleration driving cam there is provided a single indexing pin which engages the indexing groove of the cylindrical driving cam at the beginning of each linear movement in the acceleration phase, and then again at the end of the linear movement in the deceleration phase. But during the constant-velocity linear movement between these phases, one of the transport indexing pins is engaged with the indexing groove of the driving cam disposed on the opposite side of the carrier.

In an advantageous further development of the drive of the invention, the acceleration-deceleration driving cam can be provided with a three-turn indexing groove, and then on the flat side of the circular carrier facing the acceleration-deceleration driving cam, two indexing pins are provided, which are offset angularly from one another to correspond to the difference between the indexing grooves, each of the indexing pins being engaged with the associated turn in the indexing groove during half of the acceleration phase or deceleration phase, as the case may be. It is thus possible to make a rotatory movement of the index pin carrier larger than 360° available for the useful rectilinear movement. In the case of a phase offset of 40° between the two indexing pins for acceleration and deceleration, it is then possible, for example, to achieve a carrier gear rotation of 400° for the performance of the useful linear movement, and this permits a corresponding reduction of the bulk of the drive.

Figure 2:
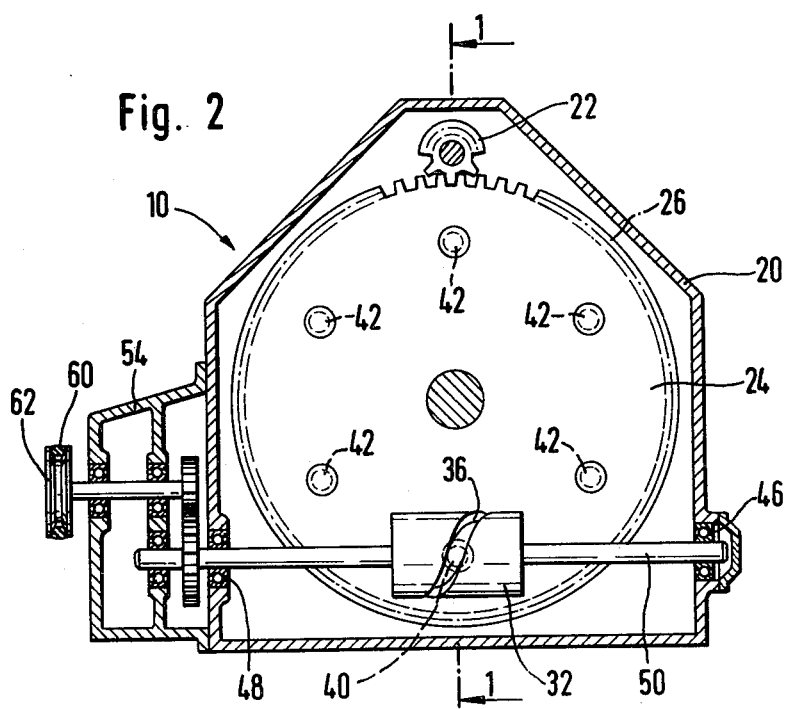
Figure 3:
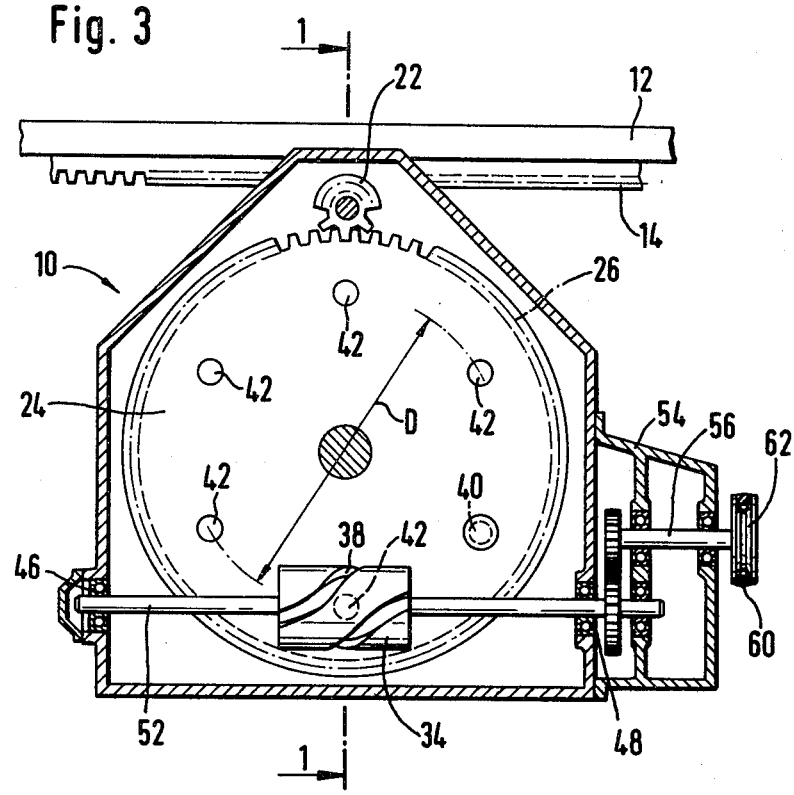
Figure 4:
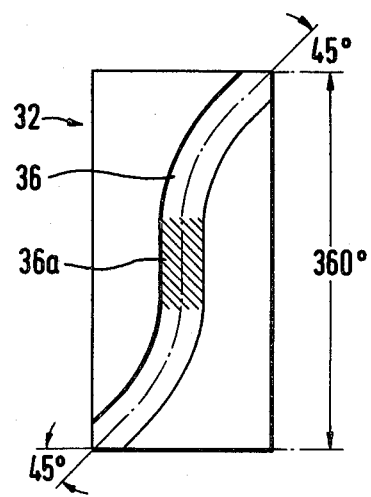
Figure 5:
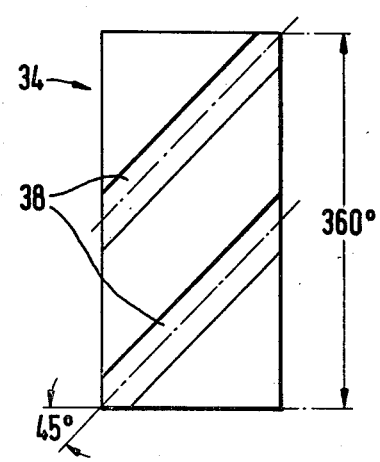
Figure 6:
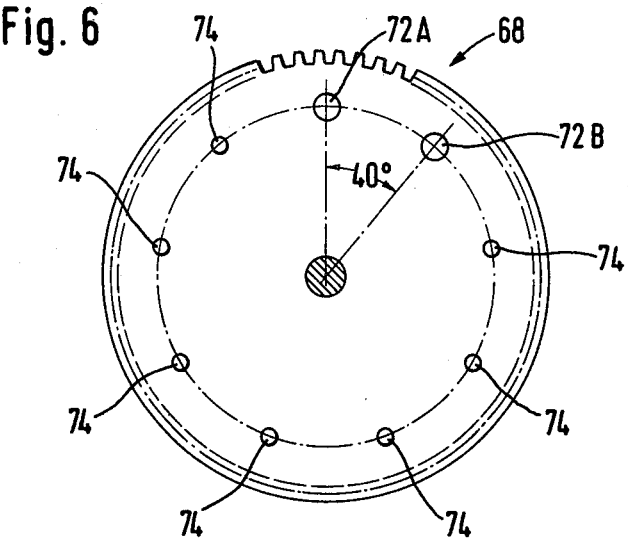
Figure 7:
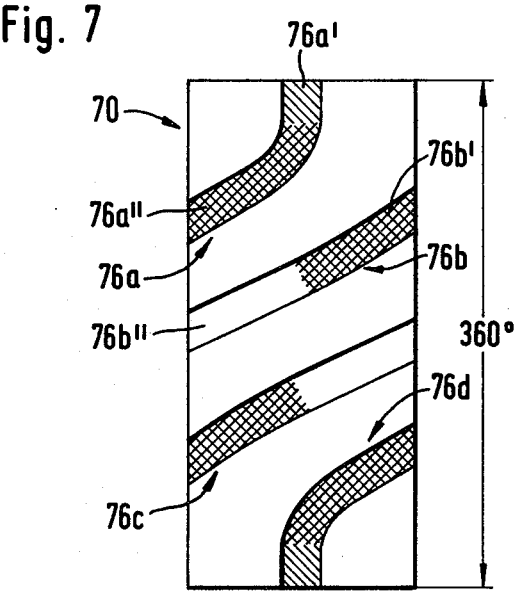

The invention will be further explained in the following description of two embodiments, in conjunction with the drawing, wherein:

FIG. 1 is a cross-sectional view through a schematic representation of a stepping drive mechanism in accordance with the invention, as seen in the direction of the arrows 1—1 in FIGS. 2 and 3, FIG. 2 is a cross-sectional view through the stepping drive of the invention as seen in the direction of the arrows 2—2 of FIG. 1, FIG. 3 is a cross-sectional view through the stepping drive of the invention, as seen in the direction of the arrows 3—3 of FIG. 1, FIG. 4 is a plan view of the development of the accelerating and decelerating drive cam of the stepping drive represented in FIGS. 1 to 3, FIG. 5 is a plan view of the development of the driving cam for constant linear velocity of the stepping drive represented in FIGS. 1 to 3, FIG. 6 is a schematic side view of a carrier component, in the form of a gear of large diameter, of a modified embodiment of a stepping drive in accordance with the invention, having two phase-offset indexing pins for the acceleration-deceleration phase, and FIG. 7 is a plan view of the development of the corresponding acceleration-deceleration drive cam.

The stepping drive of the invention shown in FIGS. 1 to 3 and generally designated as 10, is to serve for the step-wise operation of a longitudinal table 12 horizontally disposed between two work stations of a transfer line (FIGS. 1 and 3) and having a horizontal linear travel of a magnitude of 3 to 6 meters. The direct driving of the longitudinal table itself is accomplished by a pinion 16 engaging a rack 14 provided on the bottom of the table; pinion 16 is joined by a shaft 18 to a drive pinion 22 mounted in the casing 20 of the stepping drive 10, and this drive pinion meshes in turn with teeth 26 provided on the circumference of a large, upright, circular indexing pin carrier 24. Axle journals 28 projecting horizontally from the center of the carrier 24 are rotatably mounted in bearings 30 at approximately half the height of the casing. Instead of being driven through the circumferential teeth 26 and the pinion 22, the apparatus 10 might also be driven by power derived from one of the axle journals 28 brought out of the casing 20, but in that case an intermediate drive would have to be disposed between the axle journal and the pinion 16 engaged with the rack 14, and in the described embodiment this intermediate drive would be virtually equivalent to the circumferential teeth of the carrier 24 and the pinion 22. Therefore, in the described embodiment, the carrier 24 is in the form of a large, vertical gear mounted on a horizontal shaft borne in the casing 20. The transmission ratio i between this large diameter gear and the rack 14 is intentionally made equal to or less than 2, since experience has shown that when higher transmission ratios are used, vibrations can occur which would result in an undesirably rough operation of the longitudinal table 12. Assuming the transmission ratio i to be 2, and assuming the length of travel of table 12 to be 6 meters, the diameter of the carrier 24 with respect to the pitch diameter of the teeth 26 will be $$d = \tfrac{1}{2} \cdot (6/\pi) \approx 0.955 \text{ m},$$

which then indicates what the size of the casing 20 should be.

Since the carrier 24, i.e., the large gear, is fixedly coupled to the table 12 with an unvariable transmission ratio, it must therefore be driven with the accelerations and decelerations desired for the table. This drive is accomplished by means of two cylindrical cams 32 and 34 which are disposed in the lower part of the casing 20 with their axes disposed at right angles to the central axis of the carrier, these cams being in the form of cylinders having indexing grooves 36 and 38 provided in their respective circumferential surfaces, which cooperate with indexing pins 40 and 42 projecting from the flat sides of the carrier 24 and disposed at equal angular intervals on the same pitch diameter D, one indexing pin 40 being provided on the side facing the cylindrical cam 32 and engaging the indexing groove 36 at the beginning and at the end of the longitudinal table movement, while the rest of the indexing pins 42 cooperating with the cam 34 are provided on the opposite side.

In FIGS. 4 and 5, which represent developments of the circumferential surface of the cams 32 and 34, respectively, the configurations of the indexing grooves 36 and 38 are represented, and it can be seen that the indexing groove 36 curves away from a central, circumferentially disposed section 36a such that the indexing pin 40, which is initially located in this section 36a, is accelerated from zero to the desired transport velocity, which it reaches just as it leaves the one end of the groove 36. In this instant, the next-following indexing pin 42 on the opposite flat side of the support 34 enters groove 38 of the cam 34 which (in its development) has a constant pitch and consequently drives this indexing pin at a constant transport velocity. The width of the cam 34 and hence the length of the indexing groove 38 provided in it is selected precisely such that the next indexing pin 42 will enter the one end of the indexing groove 38 when the preceding indexing pin leaves the other end of the indexing groove 38. In this instant, the indexing pin 40 situated on the opposite side enters the other end of the indexing groove 36 and, after precisely one rotation of the carrier 24, reaches the circumferentially running section 36a of indexing groove 36, the carrier being again decelerated from the constant rotational speed to zero. At this point the table 12 has traveled its maximum distance. By the reversal of the direction of rotation of the cams 32 and 24, e.g., by reversal of the rotation of an electric motor coupled with the cams, the above-described cycle can be performed in the opposite direction, causing the table to perform its return travel.

The cam 32 associated, as described above, with the acceleration and deceleration of the carrier 24 and hence of the table 12, is also referred to as the acceleration-deceleration driving cam, while the cam 34 which drives the carrier at constant rotatory speed is called the transport drive cam.

The cams 32 and 34 are fastened on shafts 50 and 52, respectively, which are rotatably mounted in casing 20 in bearings 46 and 48, and one end of each is carried out of the casing 20 into a gear case 54 flange-mounted to the casing 20, in which gear case they are coupled by drive trains indicated only schematically in FIGS. 2 and 3 to a drive shaft 56 whose end extending from the gear case 54 is coupled to the electric motor 58 indicated schematically in FIG. 1. The electric motor 58 can either be flange-mounted directly on the gear case 54 with its shaft coupled by an appropriate coupling to the drive shaft 56, or, if additional speed reduction is necessary, a belt drive in the form of a gear belt or V-belt 60 (FIG. 1) can be interposed, which then is carried by a corresponding V-belt pulley 62 on the end of drive shaft 56.

FIGS. 6 and 7 show an indexing pin carrier 68 in the form of a large diameter gear as in the case of the stepping drive apparatus 10 described in conjunction with FIGS. 1 to 5, and the development of an acceleration-deceleration cam 70 of an alternative embodiment of the stepping drive of the invention, which otherwise can be the same as the stepping drive mechanism of FIGS. 1 to 3.

The carrier 68 differs from the carrier 24 in that, instead of the one indexing pin 40 associated with the acceleration-deceleration driving cam 32, two such indexing pins 72A and 72B are provided, which are spaced circumferentially from one another by an angle of, in the illustrated case, 40°, and project from the rearward flat side opposite the side that is visible in FIG. 6. The other indexing pins 74 associated with the (not illustrated) transport drive cam are likewise arranged at equal angular intervals of 40° on the remaining area of the carrier 68.

As can be seen from the development of the driving cam 70 represented in FIG. 7, this driving cam has multiple indexing grooving 76, that is to say, the indexing groove 76 for the acceleration or deceleration as the case may be, is triple, the sections marked 76a and 76b in the drawing serving for the acceleration and those marked 76c and 76d for the deceleration of the carrier. The pitch difference between the sections 76a, 76b and 76c, 76d is selected such that the indexing pin 72A leaving the circumferentially running section 76a' of indexing groove section 76a enters section 76a" where it is accelerated as a result of the shape of the indexing groove. After the carrier 68 has rotated by 20°, the indexing pin 72A leaves the indexing groove section 76a and indexing pin 72B enters into the indexing groove section 76b in whose first portion 76b' the indexing pin 72B is accelerated through an additional 20° rotation of the carrier 68. In the second portion 76b", the configuration of the indexing groove is then made such that no additional acceleration of the indexing pin takes place, but the indexing pin is driven along at the velocity which it has just attained. After the indexing pin 72B emerges from section 76b", the indexing pins 74 together with the (not illustrated) transport drive cam take over the continued driving of the carrier 68 at constant velocity until the indexing pins 72A and 72B successively come into engagement with sections 76c and 76d of the indexing groove 76 and thus bring about a two-step deceleration of the carrier 68 similar to the accelerating action.

The division of the acceleration phase and deceleration phase between two associated indexing pins 72A and 72B leads to better transmission conditions with regard to the stresses occurring when the indexing pins engage the indexing grooves, and it furthermore makes it possible to make the carrier 68 rotate by more than 360° (in the illustrated case, 360°+40°=400°) for the useful length of travel which permits a corresponding reduction of the pitch circle diameter of the circumferential teeth of the carrier. Accordingly, the dimensions of the stepping drive mechanism can then also be reduced.

I claim:

1. Stepping drive mechanism for converting a constant input rotatory movement introduced into the mechanism, to a linear movement of given length, first in an acceleration phase from zero to a certain velocity value, then at constant velocity at said value, and finally in a deceleration phase from said velocity value back to zero, said mechanism comprising: two positively coupled cylindrical driving cams journalled in a housing and to which said constant input rotatory movement introduced into the mechanism is transmitted, said cylindrical driving cams having indexing grooves provided in their cylindrical circumferential surfaces, and indexing pins provided on a carrier component coupled with the mechanism and engaging said grooves, said indexing pin carrier component being a circular disk which is mounted for rotation about a horizontally extending central axis in said housing and which has opposite flat sides from which said indexing pins project, one driving cam being associated with the acceleration-deceleration phases and arranged on one side of said disk and one with the constant-velocity value linear movement phase and arranged on the other side of said disk, said cams each having an axis of rotation disposed at right angles to said central axis of said disk, and the indexing grooves of said cams being engaged by an associated one of said indexing pins, the indexing pins associated with the acceleration-deceleration phase and with the phase of the constant-velocity linear movement being disposed on the same pitch circle diameter of the disk, said disk having at its circumference a circumferential toothing so as to form a vertically standing gear of relatively large diameter, a pinion of relatively small diameter and meshing with said gear, and a rack-and-pinion drive associated with said pinion for conversion of the pinion rotatory movement to a linear movement of said rack-and-pinion drive.

2. Mechanism of claim 1, wherein said pinion engaged with the vertically standing gear is coupled to an additional pinion which meshes with the rack of the rack-and-pinion drive, to which rack said rectilinear movement is transmitted.

3. Mechanism of claim 2, wherein the transmission ratio provided between the vertically standing gear and the rack is i≦2.

4. Mechanism of any one of claims 2 or 3, wherein the driving cam associated with the acceleration-deceleration phase has a single-turn indexing groove and on the flat side of the disk facing the acceleration-deceleration driving cam there is provided a single indexing pin.

5. Mechanism of any one of claims 2 or 3, wherein the driving cam associated with the acceleration-deceleration phase has a three-turn indexing groove, and on the flat side of the disk facing the acceleration-deceleration driving cam there are provided two indexing pins offset angularly to correspond to the pitch difference of the indexing grooves, each of the indexing pins being in engagement with the associated turn of the indexing groove during half of the acceleration-deceleration phase.

* * * * *